(No Model.)
E. G. WILLYOUNG.
GALVANOMETER.
No. 517,253. Patented Mar. 27, 1894.
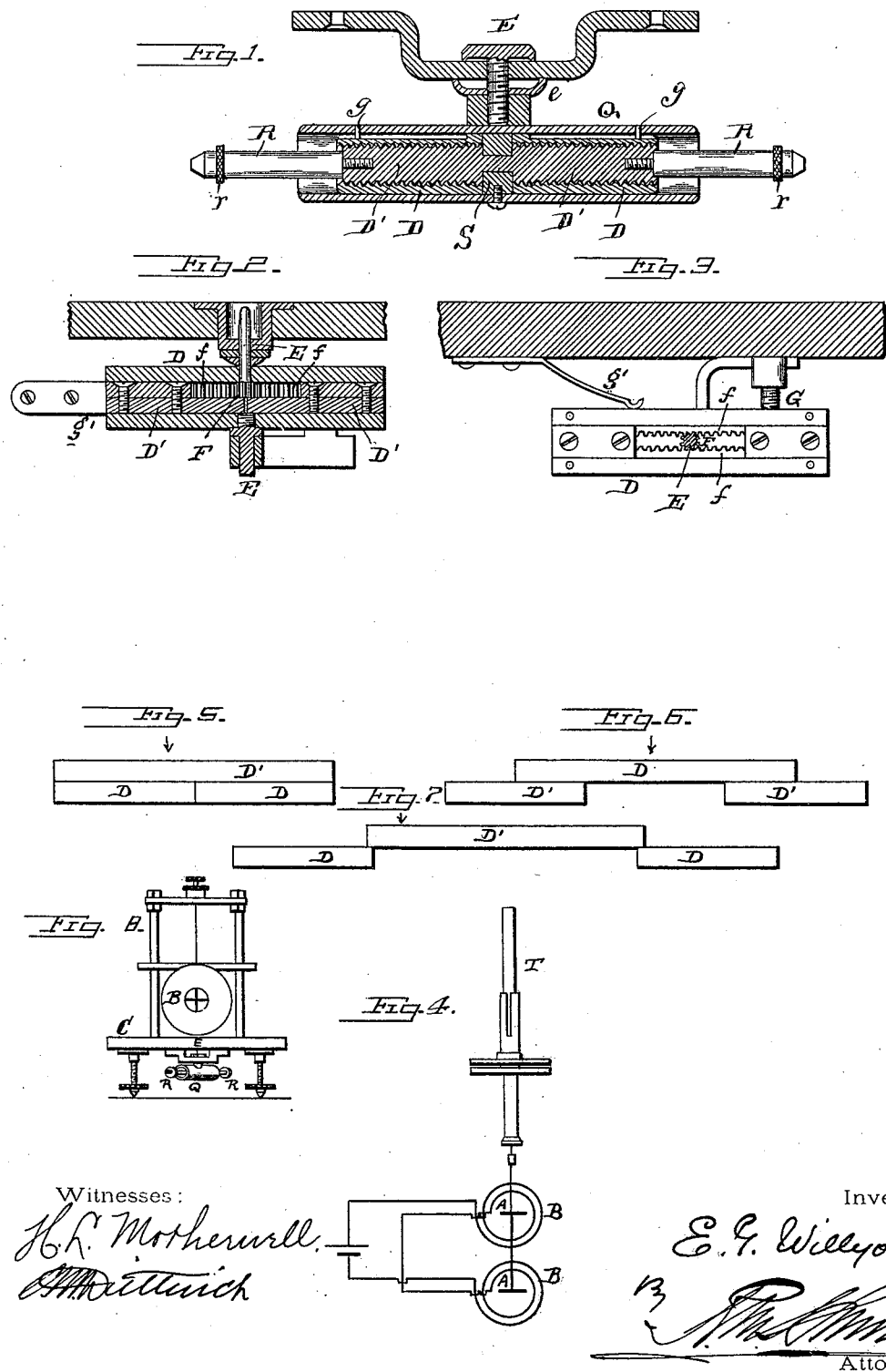
Witnesses:
H. L. Motherwell
[signature]
Inventor.
E. G. Willyoung
By [signature]
Attorney.

UNITED STATES PATENT OFFICE.

ELMER G. WILLYOUNG, OF PHILADELPHIA, PENNSYLVANIA, ASSIGNOR TO THE QUEEN & COMPANY, OF PENNSYLVANIA.

GALVANOMETER.

SPECIFICATION forming part of Letters Patent No. 517,253, dated March 27, 1894.

Application filed June 23, 1893. Serial No. 478,581. (No model.)

*To all whom it may concern:*

Be it known that I, ELMER G. WILLYOUNG, of the city and county of Philadelphia and State of Pennsylvania, have invented an Improvement in Galvanometers, of which the following is a specification.

My invention has reference to improvements in methods and apparatus for varying the sensibility of galvanometers having magnetic systems, and consists of certain improvements which are fully set forth in the following specification and shown in the accompanying drawings which form a part thereof.

My invention is applicable to all galvanometers having a movable magnet or set of magnets held in a definite position by a magnetic field and so related to an electrical circuit as to be displaced to a new position of equilibrium by the passage of a current through the circuit, the amount of such displacement being a measure of the current flowing. Heretofore there have been in use a number of devices for varying the sensibility of galvanometers of this class. One of the most common consists of a magnet adjustably supported above or below the moving magnet of the galvanometer and adapted to vary its field to any extent desired. The moving magnet of the galvanometer is pivoted or suspended in the center of the coil and held in the earth's meridian by the strength of the earth's field, the plane of the energizing coil being in the plane of the earth's meridian. It is evident that the couple tending to keep this movable magnet in the meridian is a function of the product of the strength of the magnet and the strength of the field, consequently, by increasing or decreasing this product it is possible to vary the directive couple and therefore the couple required to deflect the magnet through a given angle. Since the deflecting couple varies as the product of magnet strength and field produced by the coil, there is nothing to be gained by varying the strength of the magnet, and hence the product must be varied by varying the field at the magnet. This has usually been done by means of an exterior magnet straight or curved on the arc of a circle and so arranged that its distance from the moving magnet may be varied. Ordinarily the directive magnet slides up and down upon a rod or tube erected above the coil and lying in the axis of rotation of the moving magnet, hence as it is brought nearer the moving magnet its lines of force at the latter become more and more dense, and if they are opposed to the magnetic lines of the earth's field the resultant field acting upon the moving magnet becomes less and less and gradually approaches zero in intensity. By movement of this adjusting magnet it is possible to reverse the moving magnet. In other styles of galvanometers the single moving magnetic needle is equivalented by two magnets or groups of magnets with poles in opposite directions, and in such cases if the magnetic moment of each of the magnets or groups of magnets is the same, the total directive force upon the system for equal intensity of field at each magnet or group will be zero, and the system will stand in any meridian, and is then said to be astatic. It is usually impossible to make the moments of these two magnets or groups of magnets exactly the same and an equilibrium position is taken due to the predominance of one couple over the other. The exterior magnet is then brought into play to neutralize this predominance of one couple over the other, and may be applied to an astatic system as well as to the single magnet system. These types of galvanometers heretofore employed and above described normally require the building of a supporting structure above the instrument in such a manner as to render the instrument bulky as well as top heavy. The use of such a structure also is apt to set the instrument in objectionable vibration, since it is evident that such a supporting structure for the adjusting magnet acts like a pendulum of which the adjusting magnet serves for a bob and thus absorbs vibrations from the air easily and transmits them to the delicate galvanometer so that the moving magnet is in a condition of perpetual tremor. As most galvanometers of this type requiring high sensibility are reflecting instruments, this constant tremor is hard on the eyes of the observers. In some cases it is desired that the adjusting magnet shall have no effect upon the moving magnets or needles, and to permit the drawing away of the adjusting magnet necessary to accomplish this, requires the supporting structure to be very long or high and this necessity induces the above defects to an objectionable degree.

My invention overcomes the above objections to delicate galvanometers, and in carrying out my improvements I entirely avoid the use of a heavy mass of metal, and such motion as is transmitted to the instrument is wholly through the base as it should be.

Broadly considered my invention comprehends an adjusting magnet, adapted to any galvanometer having a moving magnetic needle, and composed of two or more parts adapted to be moved relatively to each other so as to short circuit or disperse more or less of the lines of force and to permit them to act upon the moving magnet or needle to a less or greater extent as may be desired. In the most preferred form of my invention I employ a permanent magnet combined with two pieces of soft iron movable relatively to the poles of the magnet and adapted to be moved to or from each other. When these soft iron pieces are moved close together and in close contact with the permanent magnet, the lines of force of the permanent magnet are more or less short circuited, and consequently have little or no effect upon the moving magnetic system of the galvanometer supported near it. When the soft iron bars or parts are separated and projected to a greater or less extent beyond the poles of the permanent magnet, the lines of force of the permanent magnet are dispersed into space to a greater or less extent, and consequently the density at the needle of the galvanometer changes in a corresponding manner, thus obtaining all of the advantages of the adjusting magnet of the constructions heretofore described as having been placed upon the market without its defects.

My improved adjusting magnet may be placed under the base of the instrument in a position capable of permitting adjustment and being close to the leveling screws of the instrument it is in the best position to avoid taking up and accumulating vibrations from the surrounding atmosphere or the supports. In addition to this longitudinal movement of the bars upon the permanent magnet the entire structure may be rotated or turned upon an axis in the same plane with and parallel to the axis of the needle of the galvanometer. By the adjustment of this magnet the moving magnet system of the galvanometer may be brought to zero and the galvanometer be made exceedingly sensitive. By rotating the adjusting magnet structure as a whole we may vary its magnetic meridian, and this will combine with the earth's field to produce a resultant meridian in which the moving system of the galvanometer will be in equilibrium. There are a variety of ways for carrying out this general principle of my invention and therefore I do not limit myself to the particular constructions which are hereinafter set out, for in all cases the fundamental principle of short circuiting or spreading the magnetic lines of force of the control or adjusting magnet is employed, and that constitutes the essence of my invention.

Referring to the drawings: Figure 1 is a sectional elevation of a control magnet embodying my invention. Fig. 2 is a similar elevation of a modification thereof. Fig. 3 is a plan view of the construction shown in Fig. 2. Fig. 4 is an elevation of an astatic galvanometer showing the needles and coils. Figs. 5, 6 and 7 are diagrammatic elevations illustrating the method of operation of my improved control magnets; and Fig. 8 is a diagrammatic elevation illustrating the relative preferred positions of the control and movable magnet.

A is the moving magnet or magnets of a galvanometer, and B are coils thereof through which the current to be measured is passed and which produces a magnetic field surrounding the moving magnets in a manner to cause them to be deflected or turned upon their axis.

C (Fig. 8) is the base of the instrument upon which the galvanometer proper is supported and may be made of any suitable construction. Arranged below the base I prefer to support my adjusting or control magnet.

Referring to Figs. 2 and 3 my improved control magnet is shown as formed of a pivoted soft iron frame D having superposed upon it, two permanent magnet bars D', D' of half the length and adapted to be moved to or from each other and longitudinally over and in contact with the soft iron frame D. The frame D is pivoted upon a transverse axis E and is provided with a pinion F adapted to work in contact with brass racks $f\,f$ respectively connected to the two movable magnet bars D' D'. By turning the pinion with a suitable key or thumb nut the magnets D' may be moved over the soft iron frame D.

G is an adjusting screw for tilting the control magnet as a whole upon its axis E and is opposed by a spring $g'$ adapted to operate to keep it in contact with the adjusting screw.

The control magnet is arranged immediately below and in a vertical line through the moving magnet of the galvanometer as shown in Fig. 8. It is quite evident that if desired the parts D' may be of soft iron and the frame D may be a permanent magnet. This variation in the construction is immaterial as regards the result obtained.

Another form of my invention, which perhaps is the most desirable, is that shown in Fig. 1. In this case the tubular permanent magnet is made of two parts D' D' fitted within a brass tube Q and prevented from rotating therein by means of pins and slots $g$.

The inner parts of these magnet tubes are screw threaded, one right handed and the other left handed. The soft iron bar D is held in place by a block S secured to the center of the brass tube Q and has its ends respectively screw threaded with right and left hand screw threads and adapted to work within the tubular magnet parts D' D'. The soft iron bar D is fitted on each end with brass thumb screws R having milled heads r by which it may be rotated. The bar or armature is preferably of substantially the length of the two permanent magnets D' when moved nearest together. By rotating the bar D, the magnets D' D' are caused to move outward or inward as the case may be for the proper adjustment of the magnetic lines of force about the ends of the permanent magnets. The control magnet as an entirety is pivoted upon a vertical axis E arranged in a vertical plane through the axis of rotation of the moving magnet of the galvanometer and may be held in any adjusted position by a friction spring e. In this construction the right and left hand screw threads of the bar and the permanent magnets produce the relative adjustment of the pinion and racks of the construction shown in Figs. 2 and 3. This structure is preferably pivoted below the base plate of the galvanometer as indicated in Fig. 8.

It is evident that in the case of Fig. 1 the parts D' may be soft iron armatures and be moved over the core D which may be a permanent magnet in place of the permanent magnet parts being moved over the armature or core. Either of these constructions work excellently and are both modifications of my invention generically considered.

In the diagram shown in Fig. 5 the lines of force are almost wholly short circuited. In the diagram shown in Fig. 6 the lines of force are more or less dissipated, and in the diagram shown in Fig. 7 the dissipation is carried on to a greater extent.

In Fig. 4 is shown a construction of galvanometer in which there are two needles A, A of the moving magnetic system hung in separate coils B, B to make the instrument astatic. My improvements are applicable to this style of galvanometer as well as that employing but a single needle and coil.

It will be observed that in all of these constructions which are types of the same invention, the improvement may be stated as a method and means of controlling the moving magnets of galvanometers in which a field possessed by an exterior magnet or magnets is varied more or less by the position upon or relative to such magnet or magnets of a soft iron armature or armatures which will take up a greater or less number of lines of force due to the magnet or magnets and thus short circuit or dissipate the lines of force as desired. Various additional constructions other than those set out may be employed embodying the same general principle but it is thought that there is a sufficient number of structures illustrated to clearly disclose the nature of the improvements. It is also evident that the particular structures illustrated may be more or less modified without departing from the principle of my invention.

What I claim as new, and desire to secure by Letters Patent, is—

1. The combination with a galvanometer having a magnetic element for moving the pointing or indicating devices, of means for varying the surrounding magnetic field consisting of a magnetic device formed of three parts in close relation of which two of the parts are adjustable to or from each other and relatively to the remaining part, and in which a portion of said three parts are permanently magnetic to the remaining part or parts, whereby the magnetic field produced by this magnetic device as a whole may be increased or decreased.

2. The combination with a galvanometer having a magnetic element for moving the pointing or indicating devices, of means for varying the surrounding magnetic field consisting of a magnetic device formed of three parts in close relation of which two of the parts are adjustable to or from each other and relatively to the remaining part, and in which a portion of said three parts are permanently magnetic to the remaining part or parts, whereby the magnetic field produced by this magnetic device as a whole may be increased or decreased, and a support for holding the magnetic device close to the magnetic element of the galvanometer and permitting its adjustment.

3. The combination with a galvanometer having a magnetic element for moving the pointing or indicating devices, of means for varying the surrounding magnetic field consisting of a magnetic device formed of an adjustable magnet structure in which the poles are movable to or from each other, and a soft iron armature arranged close to the magnet structure, whereby the magnetic field produced by this magnetic device as a whole may be increased or decreased.

4. A controlling or adjusting magnet for an electrical measuring instrument having a magnetic system, which consists of one or more permanent magnets combined with one or more relatively adjustable soft iron armatures or parts movable in contact with each other adapted to absorb or short circuit more or less of the lines of force of the permanent magnet or magnets, and means for adjusting the relative positions of the permanent magnet or magnets and soft iron armatures or parts without separating them.

5. An independent adjusting or controlling magnet for an electrical testing instrument having a magnetic system which consists of one or more permanent magnets and one or more soft iron armatures in which the poles of the permanent magnet or magnets are relatively movable to or from the ends of the armature or armatures and in which the movement is in the direction of the length of said armature or armatures.

6. An independent adjusting or controlling magnet for an electrical testing instrument having a magnetic system, which consists of the parts comprising one or more permanent magnets, and one or more soft iron armatures having the ends relatively movable to or from the poles of the permanent magnet or magnets, and means to adjust the permanent magnets and armature or armatures as an entirety in different planes so as to shift the magnetic lines of force relatively to the magnetic system of the testing instrument so as to increase or decrease their intensity of action.

7. An adjusting or controlling magnet for an electrical testing instrument having a magnetic system which consists of two parts one of which is fixed and the other of which is divided and the portions thereof movable to or from each other and in close relation to the fixed part, and in which one of the said parts is permanently magnetic and adapted to have its lines of force affected by the moving of the other part.

8. An adjusting or controlling magnet for an electrical testing instrument having a magnetic system which consists of two parts one of which is fixed and the other of which is divided and the portions thereof movable to or from each other and in close relation to the fixed part, and in which one of the said parts is permanently magnetic and adapted to have its lines of force affected by the moving of the other part, and means to adjust the two parts relatively to each other.

9. A controlling magnet for an electrical measuring instrument having a magnetic system which consists of two adjustable tubular parts combined with a core upon which are fitted the tubular parts and in which the said tubular parts are adapted to be simultaneously moved upon or off the said core part to vary the magnetic lines of force, and in which the movable tubular parts are relatively magnetic to the core or vice versa.

10. A controlling magnet for an electrical measuring instrument having a magnetic system which consists of two adjustable tubular parts combined with an inner part or core fitted within the tubular parts and in which the tubular parts are adapted to be simultaneously moved upon or off of the said core to vary the magnetic lines of force, and in which the movable parts are relatively magnetic to the core or vice versa, and an adjusting screw adapted to simultaneously move the movable parts toward or from each other.

11. The combination with a galvanometer having a magnetic element for moving the pointing or indicating devices, of means for varying the surrounding magnetic field consisting of a straight or substantially straight magnetic structure composed of parallel portions of soft iron and steel relatively adjustable in the direction of their length to cause the poles of the steel magnetic portion or portions to be shifted relatively to the ends of the soft iron portion or portions, whereby the magnetic field produced by this magnetic device as a whole may be increased or decreased.

12. The combination with a galvanometer having a magnetic element for moving the pointing or indicating devices, of means for varying the surrounding magnetic field consisting of a straight or substantially straight magnetic structure composed of parallel portions of soft iron and steel relatively adjustable in the direction of their length to cause the poles of the steel magnetic portion or portions to be shifted relatively to the ends of the soft iron portion or portions whereby the magnetic field produced by this magnetic device as a whole may be increased or decreased, and a support for holding the magnetic device close to the magnetic element of the galvanometer and permitting of its adjustment.

13. The combination with a galvanometer having a magnetic element for moving the pointing or indicating devices, of means for varying the surrounding magnetic field consisting of a magnetic device of variable magnetic field, and an adjustable support for holding the magnetic device to the galvanometer in the axis of its magnetic element and to permit of its movement through an arc of one hundred and eighty degrees or complete reversal.

In testimony of which invention I have hereunto set my hand.

ELMER G. WILLYOUNG.

Witnesses:
ERNEST HOWARD HUNTER,
C. M. DIETTERICH.